Dec. 25, 1951  M. M. DOUGLAS  2,579,657
VALVE STEM GUIDE WITH AIR INLET
Filed Dec. 8, 1947
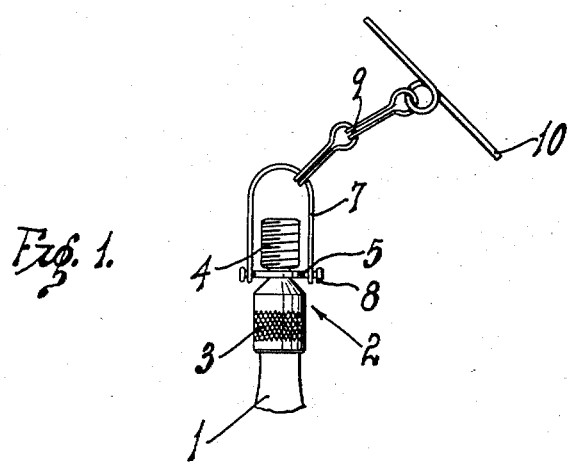
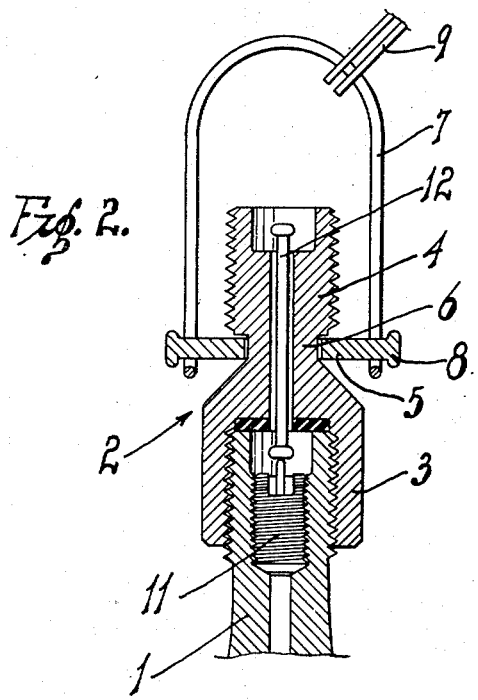
INVENTOR.
Max M. Douglas.

Patented Dec. 25, 1951

2,579,657

UNITED STATES PATENT OFFICE 2,579,657

VALVE STEM GUIDE WITH AIR INLET

Max M. Douglas, Long Beach, Calif.

Application December 8, 1947, Serial No. 790,280

1 Claim. (Cl. 152—415)

This invention relates to a valve stem guide which is attached to the valve stem of an inner tube to hold this stem in position in the wheel rim while the tire is being mounted.

An object of my invention is to provide a valve stem guide of the character stated, which includes a swivel connection between the chain and the stem cap so that this cap can be threaded onto the valve stem without twisting or mutilating the chain.

Another object of my invention is to provide a novel valve stem guide which includes a threaded nipple so that the tube may be inflated with the valve guide in position on the valve stem.

A feature of my invention is to provide a novel valve stem guide of the character stated, which is simple in construction, and which will facilitate the mounting of a tire on a rim.

Other objects, advantages and features of invention may appear from the accompanying drawing, the subjoined detailed description, and the appended claim.

In the drawing:

Figure 1 is a side elevation of my valve stem guide with air inlet.

Figure 2 is a longitudinal sectional view of the same.

Referring more particularly to the drawing, the numeral 1 indicates a valve stem which projects from an inner tube, all of which is usual and well-known. In mounting an automobile tire on the rim, it is necessary to hold this valve stem in position in the appropriate hole through the wheel rim, and to accomplish this, I provide a valve stem guide 2, which includes an internally threaded cap 3 adapted to screw onto the valve stem 1, substantially as shown. Integrally formed with a cap 3 is a nipple 4, the nipple being externally threaded to receive an air hose. A ring 5 is swivelly mounted below the nipple 4 and encircles the neck 6 between the nipple and the cap 3. A bail 7 is pivotally mounted on the ring 5, and this bail is bent around the pins 8, which project from the ring 5. A chain 9 is attached to the bail 7, and a bar 10 is attached to the end of the chain substantially as shown. The purpose of the bar is to enable the workman to more readily grasp the chain and pull the valve stem 1 through the wheel rim.

The valve stem 1 is provided with the usual core or valve 11, all of which is usual and well-known. A pin 12 extends longitudinally through the guide 2, and engages the core 11, as shown so that the valve core may be depressed when air is being inserted into the inner tube.

Having described my invention, I claim:

A valve stem guide with an air inlet comprising an internally threaded cap adapted to screw onto a valve stem, an externally threaded nipple integrally formed with said cap, a reduced diameter neck formed between the cap and the nipple, a ring surrounding the neck and rotatable thereon, a bail pivotally attached to the ring, and a chain attached to said bail.

MAX M. DOUGLAS.

REFERENCES CITED

The following references are of record in the file of this patent:

UNITED STATES PATENTS

| Number | Name | Date |
|---|---|---|
| 688,199 | Schrader | Dec. 3, 1901 |
| 1,308,219 | Brucker | July 1, 1919 |
| 2,043,380 | Kirkpatrick et al. | June 9, 1936 |

FOREIGN PATENTS

| Number | Country | Date |
|---|---|---|
| 56,046 | France | 1910 |